(12) United States Patent
Sundaresan et al.

(10) Patent No.: US 8,098,609 B2
(45) Date of Patent: Jan. 17, 2012

(54) INTEGRATED SCHEDULING OF UNICAST AND MULTICAST TRAFFIC IN RELAY-ENABLED WIRELESS NETWORKS

(75) Inventors: Karthikeyan Sundaresan, Howell, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 490 days.

(21) Appl. No.: 12/368,287

(22) Filed: Feb. 9, 2009

(65) Prior Publication Data

US 2009/0201889 A1    Aug. 13, 2009

Related U.S. Application Data

(60) Provisional application No. 61/027,962, filed on Feb. 12, 2008.

(51) Int. Cl.
*H04H 20/71* (2008.01)

(52) U.S. Cl. ......... 370/312; 370/336; 370/351; 370/442

(58) Field of Classification Search ............... None
See application file for complete search history.

(56) References Cited

U.S. PATENT DOCUMENTS

| | | | |
|---|---|---|---|
| 5,940,741 A * | 8/1999 | Briancon et al. | 340/7.22 |
| 2002/0067736 A1* | 6/2002 | Garcia-Luna-Aceves et al. | 370/442 |
| 2007/0126630 A1 | 6/2007 | Coppi | |
| 2008/0123579 A1* | 5/2008 | Kozat et al. | 370/312 |
| 2008/0137581 A1 | 6/2008 | Doppler et al. | |
| 2008/0181318 A1 | 7/2008 | Kim et al. | |
| 2008/0204319 A1 | 8/2008 | Niu et al. | |
| 2008/0214182 A1 | 9/2008 | Wang | |
| 2008/0219373 A1 | 9/2008 | Zhang et al. | |
| 2008/0274692 A1 | 11/2008 | Larsson | |
| 2008/0316143 A1 | 12/2008 | Chen et al. | |
| 2009/0003216 A1* | 1/2009 | Radunovic et al. | 370/237 |
| 2009/0080366 A1 | 3/2009 | Shao et al. | |
| 2009/0109093 A1 | 4/2009 | Sun et al. | |
| 2009/0168752 A1* | 7/2009 | Segel | 370/351 |
| 2009/0190536 A1 | 7/2009 | Zhang et al. | |
| 2009/0213779 A1 | 8/2009 | Zhang et al. | |

* cited by examiner

*Primary Examiner* — Chi H. Pham
*Assistant Examiner* — Shick Hom
(74) *Attorney, Agent, or Firm* — Bao Tran; Joseph Kolodka

(57) ABSTRACT

A wireless network with integrated scheduling of unicast and multicast users in a relay-enabled two-hop wireless network is disclosed. In this system, users with finite buffers are considered and scheduled over multiple channels in an OFDMA-based wireless network. The gain-specific and efficient scheduling system helps leverage diversity and spatial reuse gains from these networks. The system is applicable to both unicast and multicast traffic and leverages diversity and spatial reuse gains simultaneously to optimize the target network with both unicast and multicast flows. The integrated scheduling system strikes a good balance in delivering efficient performance to unicast and multicast flows.

29 Claims, 6 Drawing Sheets

US 8,098,609 B2

INTEGRATED SCHEDULING OF UNICAST AND MULTICAST TRAFFIC IN RELAY-ENABLED WIRELESS NETWORKS

This application claims priority to Provisional Application Ser. No. 61/027,962, filed Feb. 12, 2008, the content of which is incorporated by reference.

BACKGROUND

With the next generation wireless networks moving towards smaller (micro, pico) cells for providing higher data rates, there is a revived interest in multi-hop wireless networks (MWNs) from the perspective of integrating them with infrastructure wireless networks. With a decrease in cell size, relays are now needed to provide extended coverage, resulting in a multi-hop network.

In a parallel trend, orthogonal frequency division multiple access (OFDMA) has become the popular choice for air interface technology in future infrastructure wireless networks. The entire spectrum is divided into multiple carriers (sub-channels), leading to several physical layer and scheduling benefits. The two-hop network model coupled with OFDMA provides a multitude of diversity and spatial reuse gains such as:
 (i) multi-user diversity: for a given sub-channel, different users experience different fading statistics, allowing us to pick a user with a larger gain;
 (ii) channel diversity: sub-channels experiencing high gain could vary from one user to another, allowing for multiple users to be assigned their best channels in tandem;
 (iii) cooperative diversity: relays can exploit wireless broadcast advantage to cooperate and improve the SNR (signal-noise ratio) at the intended receiver; and
 (iv) spatial reuse: simultaneous transmissions on relay hop (BS-RS) and access hop (RS-MS) can be leveraged on the same channel as long as there is no mutual interference. Further, the two-hop nature with infrastructure support makes it possible to effectively leverage these gains, unlike in a large multi-hop setting.

Relay-enabled wireless networks (e.g. WIMAX 802.16j) coupled with orthogonal frequency division multiple access (OFDMA) as the air interface technology represent an emerging trend in future wireless infrastructure deployments. With the growing popularity of mobile IPTV and location-based services, it becomes essential to jointly optimize future wireless systems for not only unicast but also multicast data. While the OFDM sub-channel structure allows flexible integration of heterogeneous traffic in the system, it also calls for more sophisticated, integrated scheduling solutions that take into account the two-hop nature of the system and efficiently leverage the available diversity and spatial reuse gains.

SUMMARY

A wireless network with integrated scheduling of unicast and multicast users in a relay-enabled two-hop wireless network is disclosed. In one aspect, systems and methods for scheduling transmission in a relay-enabled two-hop wireless network includes capturing a model of finite data usage in user buffers; capturing diversity and spatial reuse gains from the two-hop network model; and performing an integrated scheduling of unicast and multicast user data flows with the finite data usage, the diversity and the spatial reuse gains.

In one implementation, users with finite buffers are considered and scheduled over multiple channels in an OFDMA-based wireless network. The gain-specific and efficient scheduling system helps leverage diversity and spatial reuse gains from these networks. The system is applicable to both unicast and multicast traffic and leverages diversity and spatial reuse gains simultaneously to optimize the target network with both unicast and multicast flows. The system supports an integrated scheduling strategy that strikes a good balance in delivering efficient performance to both the unicast and multicast flows.

Advantages of the preferred embodiment may include one or more of the following. The system provides an efficient, integrated scheduler for unicast and multicast traffic in wireless relay networks. The system enables unicast and multicast traffic to efficiently coexist in an OFDMA-based wireless relay network. The scheduling of unicast and multicast traffic is tightly coupled even if they are isolated through orthogonal spectral allocations. The nature of gains that optimize the individual traffic are complementary and the system can be jointly optimized for both unicast and multicast traffic in tandem. The system focuses on the diversity gains to optimize multicast traffic and spatial reuse gains to optimize unicast traffic. The system provides an integrated scheduling scheme that strikes a good balance in delivering efficient performance to both the unicast and multicast flows. The system exploits spatial reuse and diversity across the relay and access hops that is available at a network level. Unlike conventional unicast scheduling, the instant scheduling works on unicast and multicast data with multi-hop cellular networks. The system can support wireless systems with a more seamless integration of heterogeneous data traffic. For example, the system supports the combination of OFDMA with relays that opens up a multitude of diversity and spatial reuse gains. The system intelligently uses scheduling components that are optimized to leverage diversity and spatial reuse gains.

The system presents an integrated solution to seamlessly handle and schedule unicast and multicast users with finite buffers in future OFDMA-based wireless relay systems. Both unicast and multicast traffic receive high performance in our solution over prior art strategies that aim to optimize individual traffic in isolation. The system also requires low information feedback overhead from the network to the base station for delivering the performance benefits unlike prior art solutions.

DESCRIPTION

Figure 1A:
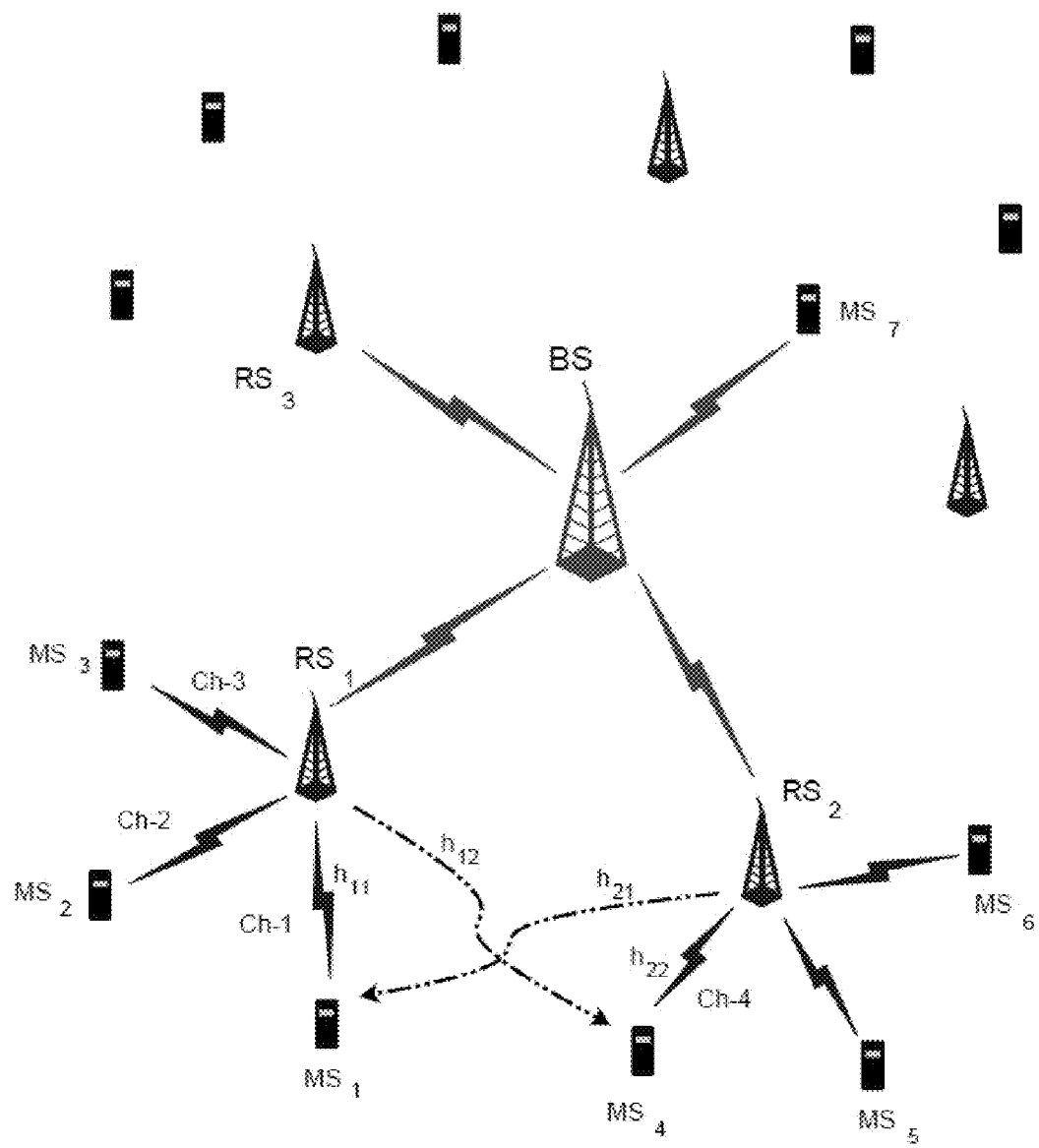
FIG. 1A shows a two-hop relay-enabled wireless network.
Figure 1B:
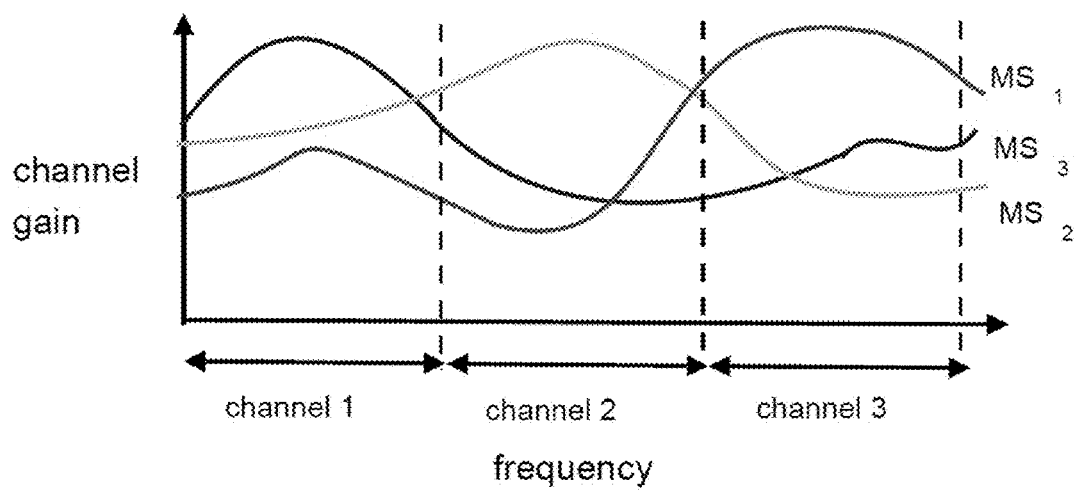
FIG. 1B shows the corresponding Multi-user, Channel Diversity System Model and Gains for the network of FIG. 1A.

FIG. 1A shows a two-hop relay-enabled wireless network while FIG. 1B shows the corresponding Multi-user, Channel Diversity System Model and Gains. In FIG. 1A, a downlink OFDMA-based, relay-enabled, two-hop wireless network includes relay stations (RS) which are connected to the wireless infrastructure (base station, BS) and provide improved coverage and capacity to several applications including serving mobile users (MS) in business hot-spots, office buildings, transportation vehicles, coverage holes, among others. A set of K mobile stations (MS) are uniformly located within an extended cell radius. A small set of R relay stations (RS) are added to the midway belt of the network. MSes that are closer to the BS directly communicate with it. However, MSes farther from the BS connect with the RS that is closest to them. The one-hop links between BS and RS are referred to as relay links, RS and MS as access links, and BS and MS as direct links. The BS, RS and MS allowed to operate on multiple channels from a set of N total OFDM sub-channels. Data (unicast and multicast) flows are considered and assumed to originate in the Internet and destined towards the MS. A subset of the total available channels ($N_m$) is reserved for multicast with the remaining serving unicast ($N_u=N-N_m$). The channel separation between unicast (UC) and multicast (MC) traffic is a practical assumption that removes interference between the UC and MC flows, while also allowing for system-wide multicast across cells along with macro (BS) diversity. The maximum power (P) used by BS for its transmission is split equally across all channels and no power adaptation across channels is assumed, given the marginal gains resulting from it. A channel could correspond to a single carrier or a group of contiguous carriers. RS (MS) are assumed to provide feedback of their relay (access) channel rates to BS (RS). All stations are assumed to be half-duplex. Hence, an RS can be active on only one of its relay or access hops in any slot.

Relay networks provide two key benefits, namely diversity (link-level) and spatial reuse (network-level) gains. Three forms of diversity gains are possible. Consider the frequency response of three channels for three MS in FIG. 1B. Multipath fading and user mobility result in independent fading across users for a given channel, contributing to multi-user diversity. Further, the presence of multiple channels and the corresponding frequency selective fading results in different channels experiencing different gains for a given MS, contributing to channel diversity. These gains make it possible to schedule multiple users in tandem, while providing good quality channels to many of them (e.g. channels 3,2 and 1 to MS 1,2 and 3 respectively). For example, unicast data $x_1$ and $x_2$ transmitted by BS on relay channels 1 and 2 towards $RS_1$ and $RS_2$, destined for $MS_1$ and $MS_2$ respectively in FIG. 1C. Due to wireless broadcast advantage, $RS_1$ and $RS_2$ receive both data from the BS. Now, in addition to $RS_1$ ($RS_2$) forwarding a coded-version of $x_1$ ($x_2$) on access channel, say 1 (2) to $MS_1$ ($MS_2$), it also cooperates to transmit a coded/transformed version of the unintended data $x_2$ ($x_1$) on the other access channel 2 (1) to increase the SNR at $MS_2$ ($MS_1$), thereby resulting in cooperative diversity gain. On the other hand, if $RS_1$ and $RS_2$ have to convey the same multicast data x to $MS_1$ and $MS_2$, then this can be achieved on the same access channel only using cooperative diversity. This is because even with identical data, interference is possible at a given MS due to potential phase difference between the paths from the two RS. The channel information needed by the RS to perform the data transformation for cooperative diversity is assumed to be available.

Figure 1C:
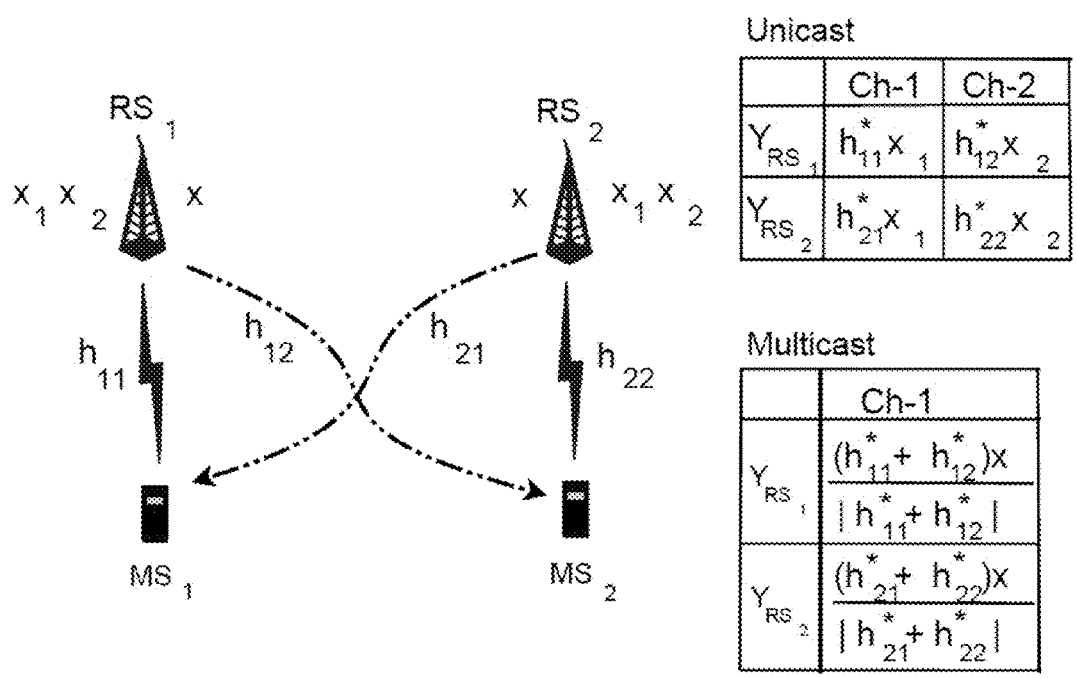
FIG. 1C shows an exemplary diagram of unicasting and multicasting in the system of FIG. 1A.

In one embodiment, simple cooperative strategies for unicast and multicast are used where each RS needs to only know the channels between itself and MSs where it intends to contribute FIG. 1C. Further, given that RS-RS cooperation provides more benefits at a distant MS than RS-BS cooperation, the system focuses on the former. To simplify, only the two neighboring, adjacent RSes are assumed to participate in cooperation with the desired RS since the cooperative gains provided by farther RS become negligible compared to the channel state information that needs to be collected. The access rates fed back from MS are assumed to incorporate the effects of cooperation and fading.

The spatial separation of RS allows relay and access links to operate in tandem, spatially reusing the same set of channels across hops without causing mutual interference to improve network capacity (e.g. BS-RS3 and RS2-MS5 in FIG. 1A).

The coupling that exists between unicast (UC) and multicast (MC) traffic is illustrated through an example using FIG. 1A where UC and MC traffic (one MC session) to all MS with orthogonal spectral allocations: $N_u$ channels to UC and 1 channel to MC. For UC, $2N_u$ network transmissions are possible using $N_u$ channels in any given slot by exploiting spatial reuse. For MC, four network transmissions to all RS using one channel (exploiting wireless broadcast advantage, WBA) is possible as shown in FIG. 1(b). In general, if there are R relays, then R network transmissions are possible using one channel. Now, when UC scheduling is combined with MC scheduling, we would expect a total of $2N_u+R$ transmissions due to orthogonal spectral allocations between UC and MC. However, only $N_u+R$ network transmissions are obtained if MC is scheduled first, followed by UC as shown in FIG. 1C or $$2N_u + \frac{R}{2}$$

if UC is scheduled first. This is because, the spatial reuse required by UC and the WBA required by MC are coupled through the half-duplex nature of the RS, making them complementary and hence precluding UC and MC from achieving their maximum performance in tandem. Thus, even if UC and MC have orthogonal spectral allocations, they are coupled through the half-duplex nature of RS, thereby necessitating joint scheduling of UC and MC flows.

Similar to the complementary nature of WBA and spatial reuse, a complementary relation exists between diversity and spatial reuse gains. The larger the population of RS and MS over which channel-dependent scheduling is performed, the larger is the potential for diversity gains. When spatial reuse gains are leveraged, the set of RS is implicitly partitioned into two sets, one operating on the relay hop and the other operating on the access hop concurrently (e.g. FIG. 1A). As a result, spatial reuse gains come at the cost of some diversity gains, wherein diversity gains are made available only across a subset of the users and relays and not across the entire population. Further, when leveraging only diversity, full exploitation of WBA is possible unlike in spatial reuse. Given the inherent trade-off between diversity and spatial reuse, schedules that optimize diversity also help optimize MC traffic, while schedules that optimize spatial reuse help optimize UC traffic. Thus, the trade-off between diversity and spatial reuse is now directly carried over to MC and UC traffic as well, indicating that MC and UC traffic cannot attain their optimal performance in tandem.

The class of schedules $S_D$ that purely optimize diversity gains do not exploit spatial reuse and hence eliminate interference. The schedule consists of relay links operating on all available channels in one slot, followed by access links using all the channels in the next slot. Thus, flows are scheduled over two-slots. Since the entire population of RS and MS is involved, the schedule leverages multi-user and channel diversity on both hops and cooperation diversity on access hop to the maximum extent. Further, channel allocations to a user (flow) on the two hops are jointly made to leverage diversity gains across hops as well.

The class of schedules $S_S$ that purely optimize spatial reuse gains implicitly partition the set of RS into a relay set $R_{RS}$ and an access set $A_{RS}$, comprising of RS operating on the relay and access hops respectively in the same slot. The entire set of channels are (spatially) reused in the two partitions. Unlike $S_D$ that potentially eliminates spatial reuse, $S_S$ allows for leveraging diversity gains (within the partitions) that remain after spatial reuse has been leveraged. Spatial reuse across hops comes at the cost of interference generated by access hop RS∈ $A_{RS}$ on relay hop RS∈ $R_{RS}$ operating on the same channel, which can be alleviated to a certain degree through scheduling.

Figure 2:
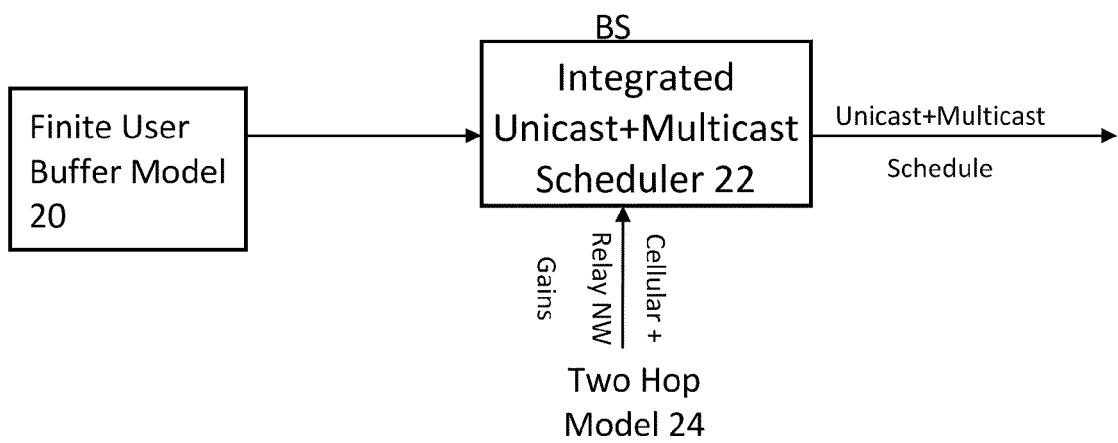
FIG. 2 shows a block diagram of processes running in an exemplary base station of FIG. 1A.

FIG. 2 shows an exemplary base station of FIG. 1A. The base station has an integrated unicast and multicast scheduler 22 that contains a finite user buffer model 20 and a two-hop model 24. The scheduler 22 generates a schedule for both unicast and multicast data.

In one embodiment, a synchronized, time-slotted system similar to WIMAX relay includes BS and RS transmitting data in frames. The scheduling decisions are made at the BS at the granularity of frames. This is the granularity at which channel state information is made available at the BS and channel state is assumed to be a constant during a frame. Every frame consists of several time slots and is populated with RS/MS assignments across both time slots and channels. The RS assignments to relay channels for the current frame and the MS assignments to access channels for the next frame are indicated to RS through a MAP that follows the preamble (such as that done in IEEE 802.16j). In every slot of a frame, a set of RS and/or MS on the relay and access hops respectively are activated based on the assignments provided by the BS.

For ease of exposition, the following discussion focuses on relay and access links. Direct links can be easily incorporated into the solutions by considering them as relay links. The scheduler 22 aims to maximize the end-to-end system throughput of unicast and multicast subject to a desired fairness model.

In one embodiment, the scheduler uses the proportional fairness model within each traffic type, given its ability to strike a good balance between utilization and fairness. A weighted fairness between unicast and multicast traffic is used in one embodiment given their disparity in performance metric definitions and network resource consumed per unit utility delivered. The system converges to the optimum if the scheduler's decisions at each epoch (interval) are made to maximize the aggregate marginal (incremental) utility, $S_{max} = \text{argmax}_{S_U, S_M} \{\alpha \Sigma_{j \in S_U} \Delta U_j + (1-\alpha) \Sigma_{G \in S_M} \Delta U_G\}$ where $\Delta U_j$ denotes the marginal flow (two-hop) utility received by unicast user j in a feasible unicast schedule $S_U$ and is given by $$\frac{\beta_j r_j^{eff}}{\bar{r}_j}$$

for proportional fairness, where $\beta_j$ captures the priority weight of user's QoS class and $\bar{r}_j$ its average throughput. $r_j^{eff}$ corresponds to the user's two-hop flow rate, which in turn is determined by the instantaneous effective rate on the relay and access hops combined.

In the above discussion, $r_j^{rel}$ and $r_j^{acc}$ represent the net bit-rates obtained for a user (flow) j on the relay and access hops respectively. The effective rate can be given by $$r_j^{eff} = \frac{\min\{r_j^{rel}, r_j^{acc}\}}{2}$$

where $r_j^{rel}$ and $r_j^{acc}$ are in turn determined by the set of relay ($A_j^{rel}$) and access ($A_j^{acc}$) channels assigned to the user, namely $r_j^{rel} = \Sigma_{n \in A_j^{rel}} r_{n,j}^{rel}$ and $r_j^{acc} = \Sigma_{m \in A_j^{acc}} r_{m,j}^{acc}$. The effective rate cannot be decoupled into independent components from the relay and access part, thereby inherently necessitating joint two-hop decisions.

For multicast traffic, the definitions are similar to unicast traffic, except that the rates (throughputs) and fairness are now defined with respect to multicast groups/sessions (G∈G) instead of individual users. The marginal flow (two-hop) utility received by group G is given by $$\frac{\beta_G |G| r_G^{eff}}{\bar{r}_G},$$

where |G| denotes its size. With reliable multicast sessions, the transmission rate for a session/group on a relay (access) channel is assumed to be given by the minimum rate of its subscribed users on the relay (access) channel. Thus, $r_G^{rel} = \Sigma_{i \in A_G^{rel}} \min_{j \in G} r_{i,j}^{rel}$ and $r_G^{acc} = \Sigma_{k \in A_G^{acc}} \min_{j \in G} r_{k,j}^{acc}$ with $r_G^{eff} = \min\{r_G^{rel}, r_G^{acc}\}$.

Unicast Strategy (i) Relay hop bottleneck: Two cases exist: (a) If cooperative diversity on access hop is not exploited, then an RS on the relay hop receives interference from only one of the RS operating on the same channel from access hop, which in turn can be eliminated through intelligent scheduling; (b) If cooperative diversity is leveraged, then a relay hop RS receives higher interference from multiple access hop RS, which in turn may not be eliminated through scheduling. However, since the relay hop is the bottleneck, improving the access hop capacity through cooperative diversity will not contribute to increased flow utility but instead only degrade performance by generating more interference on the already bottlenecked relay hop. Thus, spatial reuse schedules with no cooperative diversity best optimize UC traffic when relay hop is the bottleneck.

(ii) Access hop bottleneck: With the access hop being the bottleneck here, a spatial reuse schedule should leverage cooperative diversity since this will improve the bottleneck capacity. While this will increase the interference on the relay hop, bringing down its rate, it will not degrade the flow utility as long as the relay hop does not change into the bottleneck. Thus, spatial reuse schedules with cooperative diversity best optimize UC traffic when access hop is the bottleneck. Thus, irrespective of the network condition, spatial reuse schedules optimize UC traffic the best.

Multicast Strategy (i) Relay hop bottleneck: The power of cooperative diversity is larger for MC, wherein a single channel can be used to operate all RS in parallel on the access hop in $s_d$, leveraging cooperation and WBA since they have identical data. Such cooperation, when coupled with spatial reuse however, causes severe interference on the relay hop in $s_s$ which cannot be accommodated through scheduling. On the other hand, if no interference on relay hop is to be generated then no spatial reuse or cooperation must be leveraged on the access hop. This would essentially turn MC flows into UC flows, thereby completely losing out on the WBA of MC data. Consequently it would require much more scheduling resources on the access hop, potentially turning it into a bottleneck. Thus, the loss in WBA, a key factor for MC unlike UC, significantly outweighs the benefits of spatial reuse in $s_s$. On the other hand, $s_d$ completely leverages WBA (through RS cooperation) and diversity gains. Thus, diversity schedules best optimize MC traffic when relay hop is the bottleneck.

(ii) Access hop bottleneck: Since access hop is the bottleneck, $s_s$ can leverage cooperative diversity on the access hop to improve its capacity. Though the relay hop is not the bottleneck and can sustain some interference without affecting the system utility, the interference generated due to cooperative diversity is much more severe in MC than in UC and could potentially turn the relay hop into a bottleneck. Thus, diversity schedules best optimize MC traffic when access hop is also the bottleneck. Thus, irrespective of the network condition, diversity schedules optimize MC traffic the best.

Integrated Traffic Scheduler

While diversity ($s_d$) and spatial reuse ($s_s$) schedules optimize MC and UC traffic respectively in isolation, they suffer a tradeoff when considered in conjunction. Given that the spatial reuse gains are obtained at the cost of some diversity gains, the system leverages the right amount of diversity and spatial reuse gains in each slot to strike the optimal balance between UC and MC and hence maximize the aggregate system utility. However, such a fine-grained exploitation of gains in each slot would incur high complexity, making the solution non-amenable to real-time implementation.

In one embodiment, the diversity and spatial reuse gains are not efficiently arbitrated at the granularity of every slot in a frame, but instead at the granularity of frames. This would allow either diversity or spatial reuse specific schedules to be applied on a per-slot basis, but adaptively alternate between them to ensure efficient arbitration of their gains to MC and UC traffic over a frame. This is sufficient since the channel state information remains a constant over a frame and scheduling decisions are also made only at the granularity of frames. Further, focusing on gain-specific schedules will help utilize the polynomial-time, efficient schedulers developed for diversity and spatial reuse and in turn combine them into an efficient, integrated scheduler that is amenable to real-time implementation.

Thus, $s_d$ and $s_r$ can be used to optimize MC and UC traffic respectively, and given $s_d$ and $s_r$, an integrated scheduler (INT) is used that provides efficient performance to both UC and MC flows.

Figure 3:
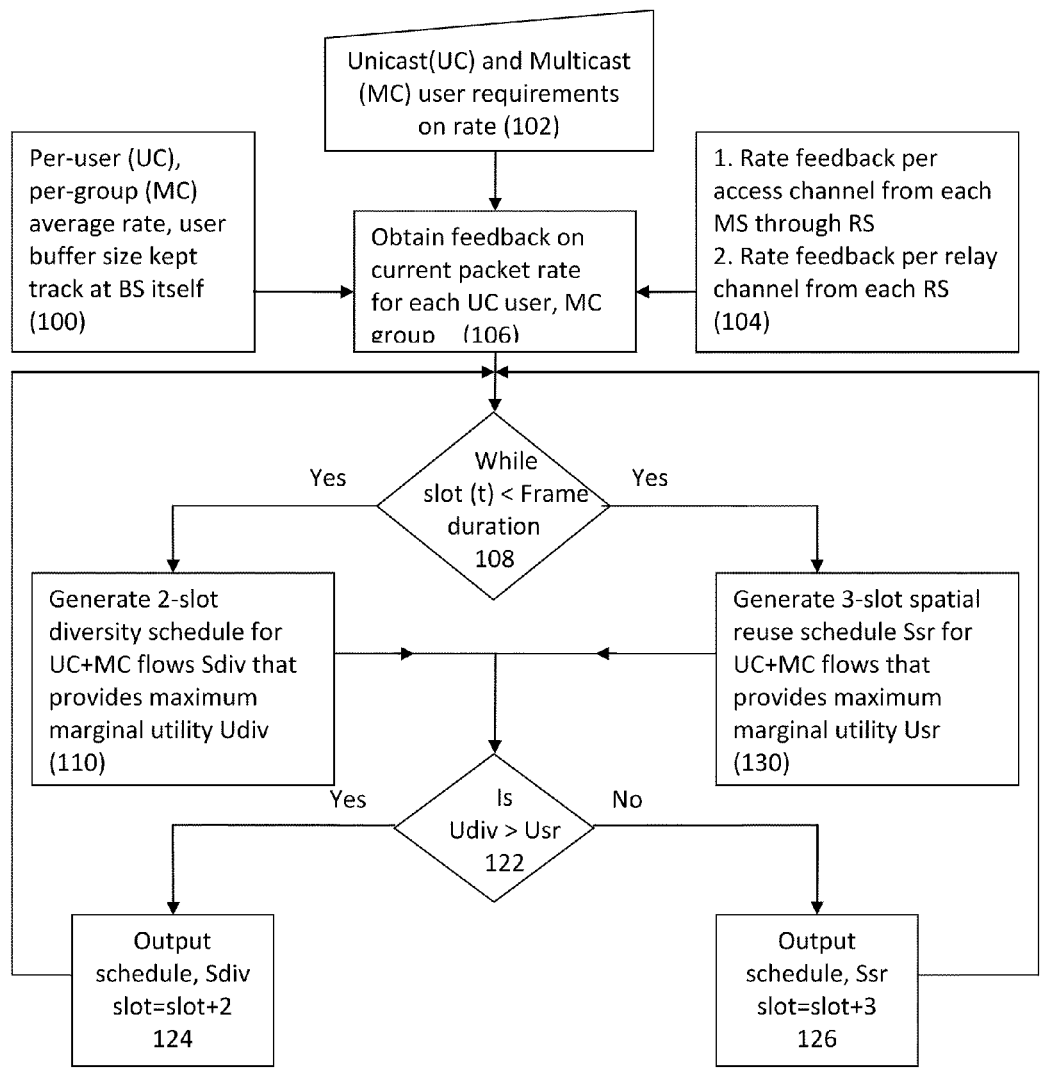
FIG. 3 shows an exemplary process for providing integrated unicast and multicast scheduling.

FIG. 3 shows an exemplary process for providing integrated unicast and multicast scheduling. In this process, the base station (BS) keeps track of the average unicast user throughputs and multicast session throughputs for fairness purposes as well as track of the finite user buffers (100). The BS also tracks unicast (UC) and multicast (MC) user requirements on rate (102). The BS also receives feedback per access channel from each MS through RS and the feedback per relay channel from each RS (104). At the start of every frame, the BS requests relay stations, RS and mobile stations, MS to provide feedback on the relay and access channel instantaneous rates respectively to perform channel dependent scheduling, thereby exploiting diversity gains (106).

Since diversity and spatial reuse are the two key benefits from relay networks, BS generates two schedules, one that leverages maximum diversity gains (110) and the other that leverages maximum spatial reuse gains (130). These schedules are obtained considering both the unicast and multicast flows together. The diversity schedule is a two-slot schedule, while the spatial reuse schedule is a three-slot schedule. Next, the process checks to see if a slot is less than a frame duration (108) so that the BS generates schedules that are "gain-specific". If the slot is less then the frame duration, in 110, the process generates a 2-slot diversity schedule for UC+MC flows (Sdiv) that provides maximum marginal utility (Udiv). Otherwise, in 130, the process generates a 3-slot spatial reuse schedule (Ssr) for UC+MC flows that provides maximum marginal utility (Usr).

The BS uses a utility measure per user or session that not only accounts for instantaneous rate but also fairness in its scheduling decisions. The BS determines the net marginal utility per slot that would result from the diversity and spatial reuse schedules and decides to execute the one providing the highest marginal utility. In 122, the process checks if Udiv is greater than Usr and if so, the process generates the schedule Sdiv and increments the slot by two as this is a 2-slot diversity schedule (124). Alternatively, if Udiv is less than Usr, the process generates the schedule Ssr and increments the slot by three since this is a 3-slot spatial reuse schedule (126). If a diversity schedule is chosen, the schedule obtained for two slots is executed; otherwise the spatial reuse schedule for three slots is executed.

The BS then proceeds to determine the schedule for the next set of slots. Thus, schedules are obtained in multiples of two or three slots. The diversity schedule optimizes the multicast (MC) flows, while the spatial reuse schedule optimizes the unicast (UC) flows, and switching between the two schedules even within a frame provides efficient allocation of resources between the unicast and multicast flows, while accounting for fairness as well. Once the schedule is determined for all slots in a frame, the frame is then scheduled allowing transmissions to multiple users on multiple channels simultaneously on the two hops, while leveraging both diversity and spatial reuse gains.

Figure 4:
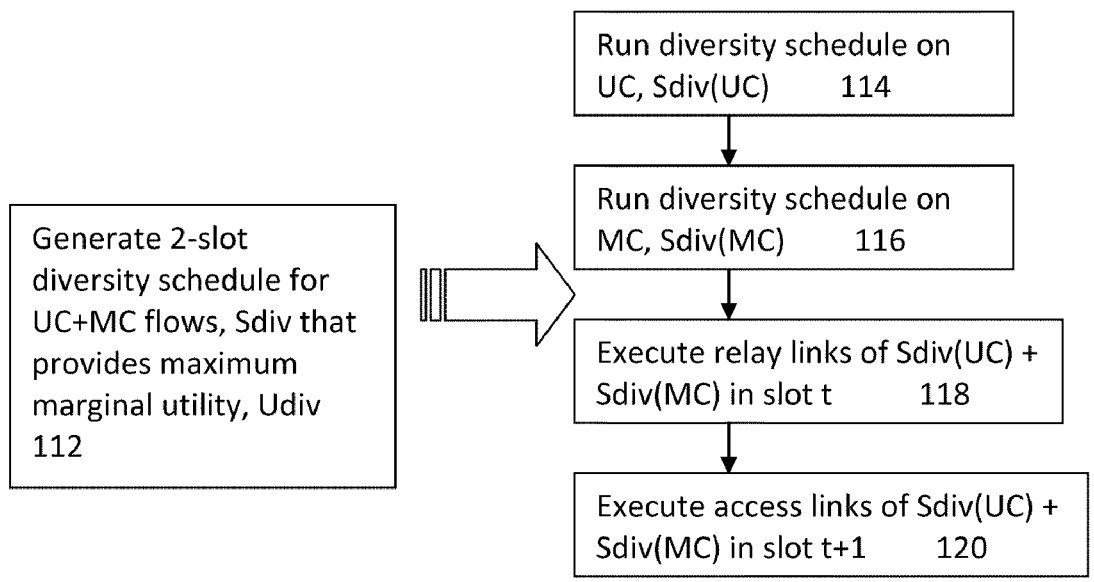
FIG. 4 shows in detail one embodiment of the two slot diversity schedule generation process.

FIG. 4 shows in detail one embodiment of the two slot diversity schedule generation process. The process generates a 2-slot diversity schedule Sdiv for UC+MC flows that provides maximum marginal utility Udiv (112). First, the process runs a diversity schedule on UC denoted as Sdiv (UC) in 114. Next, the process runs a diversity schedule on MC denoted as Sdiv (MC) in 116. In 118, the process executes relay links of Sdiv (UC) and Sdiv(MC) in slot t+1. Next, in 120, the process executes access links of Sdiv (UC) and Sdiv(MC) in slot t.

In summary, in the diversity schedule, the BS runs an underlying diversity algorithm (DIV) on the set of UC and MC flows independently to obtain two-hop flow schedules for UC and MC. The relay links of the UC and MC flows in the schedule generated are then put together and scheduled in slot t, while the UC+MC access links are scheduled in slot t+1. The underlying diversity algorithm (DIV) leverages multi-user, channel and cooperation diversities both within and across hops.

Figure 5:
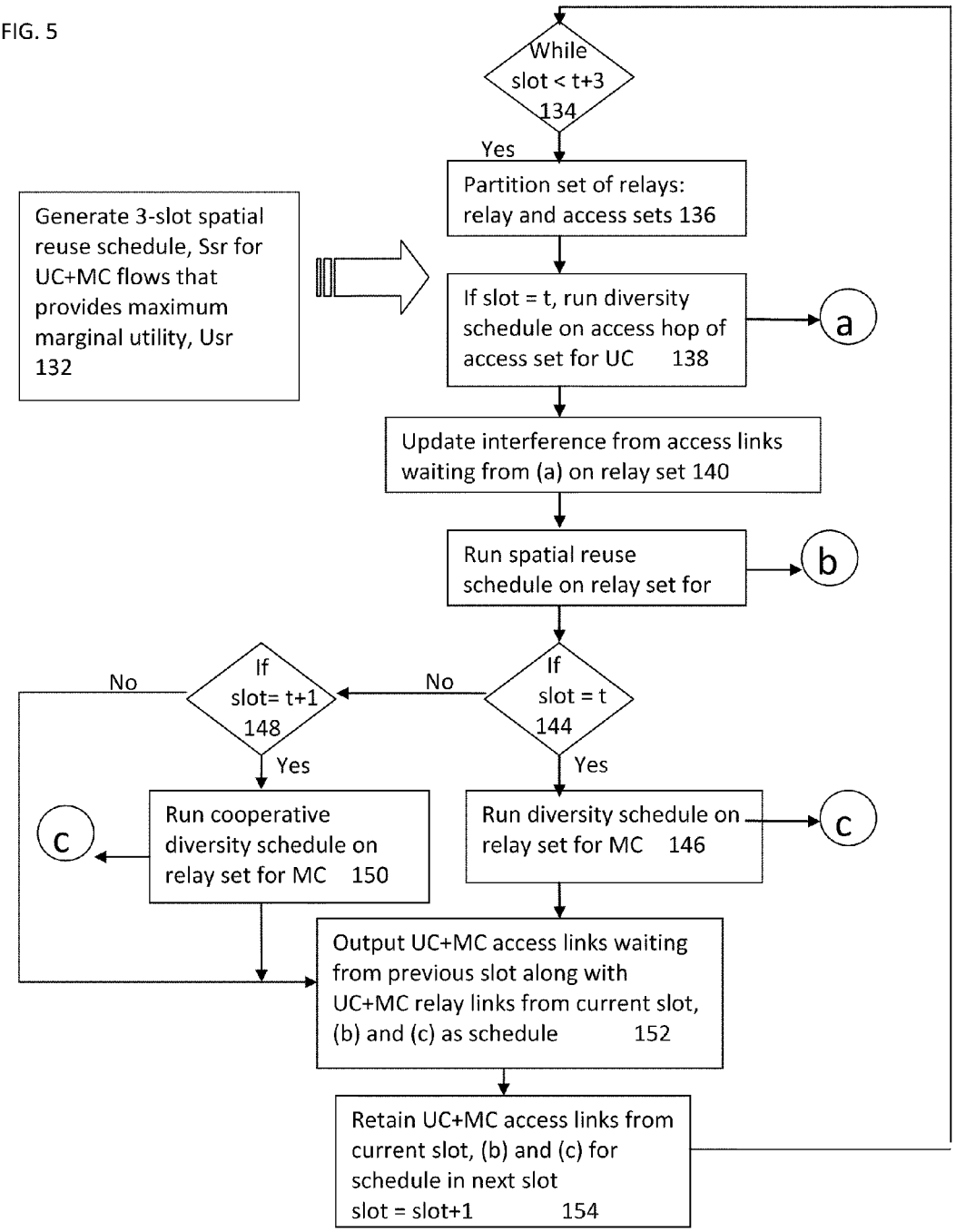
FIG. 5 shows in detail one embodiment of a three slot spatial reuse schedule generation process.

FIG. 5 shows in detail one embodiment of a spatial reuse schedule generation process. This process generates a 3-slot spatial reuse schedule Ssr for UC+MC flows that provides maximum marginal utility Usr (132). The process checks to see if the slot is less than t+3 (134). If so, the process partitions a set of relays including relay and access sets (136). In 138, the current slot is t, then the process runs a diversity schedule on an access hop of the access set for UC (a). Next, the process updates interference feedback information from access links on the relay set (140). In 142, the process then runs a spatial reuse schedule on the relay set for UC (b). Next, in 144, the process checks if the current slot is t and if so, the process runs the diversity schedule on the relay set for MC(c). From 144, if the current slot is not t, the process checks if the slot is t+1 and if so, the cooperative diversity schedule is run on the relay set for MC in 150 (c). From 146, 148 or 150, the process outputs UC and MC access links waiting from the previous slot along with the UC and MC relay links from the current slot, from (b) and (c) as the schedule in 152. Next, the process retains UC and MC access links from current slot, (b) and (c) for schedule in the next slot and increments the current slot in 154.

Thus, in FIG. 5, the BS uses three underlying processes in generating an efficient spatial reuse schedule for both UC and MC flows: DIV—leverages multi-user and channel diversity gains within and across hops and cooperation diversity within hops; COOP-DIV—leverages cooperative diversity gains across hops for MC flows in addition to those leveraged in DIV; SR—leverages spatial reuse. The BS partitions the set of RS into a relay and an access set. If there is UC data waiting on the access hop, BS runs DIV scheduler on the access hop of the access set for UC flows. The BS updates interference from the (UC+MC) access links (waiting to be scheduled from previous slot) on the relay set.

The BS then runs its SR scheduler on relay set for UC flows. If it is the first slot of the spatial reuse schedule, BS runs its DIV scheduler on the relay set for MC flows. Alternatively, if it is the second slot, then BS exploits the fact that same data will be transmitted on the relay and access hops for MC flows and hence leverages cooperative diversity across hops by using its COOP-DIV scheduler on MC flows. If it is the third slot, then no MC data is scheduled.

The BS then obtains the (UC+MC) access links waiting from previous slot, combines them with the relay links of UC and MC flows and schedules them all in the current slot. The BS retains the access links for UC and MC flows for scheduling in the next slot and the process repeats until three slots have been scheduled.

Since simultaneous transmissions (spatial reuse) are not leveraged on the same channel, the relay and the access hops are scheduled sequentially in two slots, satisfying the half-duplex constraint of RS. The data that is meant for a MS, to be sent using different sets of channels on the relay and access hops. This allows for diversity gains across hops in addition to those available within hops. The system finds a two-slot schedule, namely an assignment of N channels to RS and MS on the relay and access hops respectively, such that the aggregate marginal utility of the system (K users/flows) is maximized at every scheduling epoch. Next, the various scheduling schemes are detailed.

Diversity Scheduler, DIV

DIV is applicable to both UC and MC traffic. In a given scheduling epoch, the problem solved by DIV for MC (UC) is essentially to find a two-slot schedule, namely an assignment of $N_m$ ($N_u$) channels to RS in first slot and $N_m$ ($N_u$) channels to MS in second slot on the relay and access hops respectively, such that aggregate marginal utility of the MC (UC) schedule is maximized over two slots. The number of channels and the specific channels assigned to a user/session could be different on the relay and access hops. This flexible channel assignment allows efficient utilization of diversity gains not just within hops but also across hops. Further, users are assumed to have finite data in their buffers at the BS.

The incorporation of either flexible channel assignment or finite user buffer constraint is sufficient to make the problem NP-hard. If the users are assumed to have backlogged buffers and if channel assignment is made to users/sessions in (relay, access) channel pairs (# relay channels=# access channels in every user/session allocation), then the problem can be mapped to a maximum (utility) weighted bipartite matching problem, which can be solved optimally.

UC Spatial Reuse Scheduler, SR

In any given slot, there reside data in some of the user buffers at RS and BS, waiting to be scheduled on access and relay hops respectively. The spatial reuse scheduling problem for UC is: given a potential set of MS and RS waiting to be scheduled on access and relay hops respectively, find a set of access links with an assignment of $N_u$ channels and a corresponding set of relay links reusing the same set of $N_u$ channels, such that aggregate marginal utility of the schedule is maximized in the given slot.

Unlike in DIV, channels are spatially reused in SR. Hence, the impact of interference caused by access links on the relay links must be taken into account. Further, while flow schedules over two-slots were sufficient in DIV, the use of spatial reuse in SR necessitates link schedules in each slot. However, the effective rate and hence the marginal utility of a flow cannot be decoupled into independent relay and access link contributions, making it difficult to directly obtain efficient link schedules. To address this challenge, one potential approach is: (i) BS partitions the set of RS into a relay set and an access set, comprising of the RS that will operate on the relay and access hops respectively in the same slot. The partitioning accounts for the half-duplex nature of RS and also takes into account load balancing. (ii) BS runs the diversity scheduler, DIV on each of these sets to obtain two flow schedules, eliminating the need to decouple flow marginal utilities into their link components. (iii) The two flow schedules are not obtained independently, but are determined subject to the interference generated by each other. (iv) From the flow schedules obtained on the two disjoint sets of RS, a link schedule exploiting spatial reuse across the sets and diversity within the sets is generated.

MC Spatial Reuse Scheduler, COOP

While the interference generated during spatial reuse can be alleviated through scheduling in UC, this is not possible with MC. To leverage WBA to transmit identical data from multiple RS on the same access channel, cooperative diversity is employed on access hop. However, this significantly increases the interference on that channel on relay hop, making it difficult to be reused. However, reuse of channel(s) across hops is still possible, if identical data is being conveyed on the two hops on a given channel and if cooperative diversity is leveraged across hops. Similar to RS cooperating within the access hop, RS on access hop will now cooperate with BS on relay hop to reuse channels in conveying identical data. Thus, the problem solved by COOP is: given a potential set of MS and RS waiting to be scheduled with identical data on access and relay hops respectively, find a set of access links with an assignment of $N_m$ channels to sessions and a corresponding set of relay links reusing the same set of $N_m$ channels, such that aggregate marginal utility of the schedule is maximized in the given slot.

Though COOP leverages spatial reuse of channels, there is no interference involved as it is alleviated through cooperation. As a result, the problem can be posed as a variant of the diversity problem and hence DIV solutions can be extended to incorporate cooperation across hops to provide solutions.

The essence of the integrated scheduler is to adapt between diversity and spatial reuse schedules across slots, choosing the one providing the maximum marginal utility per slot. With a diversity scheduler, a two slot schedule ($S_{DIV}$) is obtained, while a three-slot schedule ($S_{SR}$) is obtained with the spatial reuse scheduler (lines 1-10). These correspond to the number of slots required to transfer one round of UC and MC data to the MS under a particular scheduler. When a diversity (spatial reuse) schedule is adopted in a slot, modifications are made to the schedule to improve the performance of the UC (MC) traffic that is not directly optimized by the chosen schedule.

Diversity Scheduler

When DIV is used, it provides the best performance to MC flows. However, UC flows cannot leverage spatial reuse if all RS are involved in the flow schedule (due to half-duplex RS). To alleviate this, BS first finds the set of RS $\mathcal{R}_{MC}$ for which there is active MC data waiting to be scheduled (MC relay grouping). If ($\mathcal{R}_{MC}$) then it is sufficient to apply DIV for MC alone on $\mathcal{R}_{MC}$. This automatically provides a partition of RS over which spatial reuse can be leveraged for UC through SR, without compromising on the diversity gains provided by DIV for MC. $\mathcal{R}_{MC} \subset \mathcal{R}$ can happen in practice whenever MC sessions are bursty or geographically localized. If however, $\mathcal{R}_{MC} = \mathcal{R}$, then UC is compelled to use DIV as well. The relay and access hop links of UC and MC are then put together in the corresponding slots based on the individual schedules obtained.

Spatial Reuse Scheduler

SR provides the best performance to UC flows. However, when applied to MC flows, they perform less well than WBA and suffer from interference on the relay hop. If spatial reuse is not leveraged when DIV is applied for MC on the partitions created by SR (for UC), then interference is eliminated but due to the loss of WBA from partitioning, it would take four slots to transfer MC data to the MS. In the absence of relay set partitioning, this would have only taken two slots with DIV. To alleviate this loss of WBA in MC, COOP that employs cooperative diversity across hops enables spatial reuse for MC without interference, thereby helping transfer MC data in three slots. Thus, a combination of SR and COOP optimizes UC, while also keeping the loss in MC performance (compared to optimal) to a minimum.

The set of RS is partitioned taking into account the load of both UC and MC flows to determine $R_{RS}$ and $A_{RS}$. It is sufficient to partition the relay set at the beginning of a frame. SR is run on the partitioned sets for UC, resulting in a link schedule for current slot, while accounting for the interference generated across relay and access links in the schedule. Since there is potentially no MC data waiting to be scheduled on the access hop at the beginning of a spatial reuse schedule, DIV is run for MC flows on $R_{RS}$ without any interference. The access links resulting from execution of DIV on MC data is retained for next slot t+1.

The data transferred on the relay hop in a previous slot (t), constitute the potential data to be scheduled on the access hop in the current slot (t+1). Hence, $R_{RS}$ and $A_{RS}$ are interchanged every slot of a spatial reuse schedule. SR is applied to UC flows as before in slot t+1. However, for MC schedule on the relay hop, we will now have interference from the MC access links waiting from the previous slot, $S_{MC}^{acc}$(t+1). Recall that, due to RS partitioning, only some of the RS received the MC data on the relay hop in slot t. In slot t+1, when the received data is to be transferred on the access hop, the same data also has to be transferred to the remaining set of RS on the relay hop. Given identical data, interference is converted to spatial reuse through cooperation by applying COOP to relay set $R_{RS}$. This results in a new set of relay and access links to be scheduled for MC in slot t+1 that leverage cooperation, while also providing the access hop schedule for MC in the next slot t+2.

In slot t+2, after interchange of relay sets, SR is once again applied to UC flows, while no scheduler is run for MC traffic and the MC access links waiting from previous slot, $S_{MC}^{acc}$(t+2) are alone scheduled for MC traffic. This is because, if the MC data waiting at BS on the relay hop in slot t+2 is scheduled, it will correspond to new data that is different from the one waiting to be scheduled on the access hop, thereby receiving interference that cannot be alleviated through cooperative diversity across hops. This also explains why there is potentially no MC data waiting to be scheduled on the access hop at the beginning of a spatial reuse schedule. Thus, we find that in three slots, one round of UC and MC data can be delivered to the MS. While the UC schedule given by SR provides the best performance for UC traffic, the combination of DIV and COOP for MC traffic eliminates interference between MC flows, and at the same time recovers some of lost spatial reuse gains in the form of cooperative diversity gains across hops.

To summarize, the benefits of the integrated UC and MC scheduler (INT) are (i) it provides a good balance in delivering efficient performance to both the UC and MC flows within a frame; (ii) it uses polynomial-time, practical diversity and spatial reuse solutions as the core components to build an efficient, integrated, polynomial-time scheduling solution, making it conducive for real-time implementation at the granularity of frames; and (iii) it alleviates any potential loss in spatial reuse gains for UC and MC during diversity and reuse schedules respectively by leveraging MC relay grouping and cooperative diversity across hops respectively.

Next, the performance of the integrated scheduler is evaluated. The system has been evaluated in an event-driven simulator to highlight its effectiveness and the relative significance of different gains to unicast and multicast traffic. An event-driven, packet level simulator written in C++, named QNS is used for evaluating system performance. A single cell relay-enabled OFDMA downlink system is considered. The extended radius of the cell is assumed to be about 600 m. RSes are distributed uniformly within a region of $250 \text{ m} \leq r \leq 350$ m. The wireless links incorporate path loss and Rayleigh fading as well as interference from other links operating on the same channel. Each user's Rayleigh channel has a Doppler fading equivalent to a velocity of 3-10 Km/hour. Constant bit rate (CBR) applications are used as the generators of traffic. A time slot is consider to be of 5 ms duration, and carrier frequency is assumed to be 2 GHz. The peak rate of the individual sub-channels is 250 Kbps. The number of users and relays the parameters of variation. The data flows are sent at 125 Kbps. The metrics of evaluation are throughput and utility.

Individual diversity (DIV) and spatial reuse (SR) solutions are used to optimize MC and UC traffic respectively in isolation. The performance of these traffic-specific solutions is compared to that of the system's integrated traffic scheduler, INT, in a system that has combined UC and MC traffic. A total of 12 OFDM sub-channels are considered with 4 for multicast and 8 for unicast traffic. The total number of UC+MC users in the system is 40. The UC and MC users are uniformly distributed across the relays and every relay has at least one user subscribed to a multicast session. There are equal number of UC and MC users (20). The evaluations show that UC (SR) and MC (DIV) specific solutions provide the best performance for their respective traffic. However, they incur a significant degradation of close to 100% for the other traffic type. Further, the performance of SR for MC traffic degrades with increasing relays due to the increased interference generated on the relay hop from the access hop during spatial reuse. On the other hand, the integrated scheduler INT strikes an efficient balance between the traffic specific strategies, providing a throughput performance of 50-100% over either of them in isolation and also being within 15-20% that of the best strategy. The traffic utility results indicate that INT provides a gain of 35-60% over traffic-specific strategies and is within 10% of the best strategy.

The system has also been tested on the throughput and aggregate utility performance as a function of increasing number of MC users in the system, with the number of UC users correspondingly decreasing. The results clearly indicate that as the load shifts between UC and MC traffic, DIV and SR solutions suffer a significant loss in performance in the region of large UC and MC users respectively. INT, on the other hand, provides the most effective trade-off with the largest aggregate system utility, providing close to 40% gains over DIV and SR. The utility results are also indicative of the higher degree of fairness delivered by INT both across and within UC and MC traffic compared to individual strategies.

The foregoing shows the high performance of the wireless network with integrated scheduling of unicast and multicast users in a relay-enabled two-hop wireless network. The gain-specific and efficient scheduling system helps leverage diversity and spatial reuse gains from these networks. The system is applicable to both unicast and multicast traffic and leverages diversity and spatial reuse gains simultaneously to optimize the target network with both unicast and multicast flows. The tests show that the integrated scheduling strategy strikes a good balance in delivering efficient performance to both the unicast and multicast flows.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for scheduling transmission in a relay-enabled two-hop wireless network, comprising:
   a. capturing a model of finite data usage in user buffers;
   b. capturing diversity and spatial reuse gains from the two-hop network model;
   c. performing an integrated scheduling of unicast (UC) and multicast (MC) user data flows with the finite data usage, the diversity and the spatial reuse gains; and
   d. generating a diversity schedule for maximum diversity gains and a spatial reuse schedule to leverage maximum spatial reuse gains, said diversity schedule comprising a two-slot schedule, and the spatial reuse schedule comprising a three-slot schedule.

2. The method of claim 1, comprising:
   a. maintaining at a base station (BS) an average user throughput rate for unicasting or an average group throughput rate for multicasting, and
   b. collecting instantaneous channel information from relay and access hops.

3. The method of claim 1, comprising scheduling users with finite data buffers over multiple channels in an OFDM-based relay wireless network.

4. The method of claim 1, comprising scheduling a transmission of a frame to multiple users on multiple channels simultaneously on two hops after a schedule is determined for all slots of a frame.

5. The method of claim 1, comprising performing gain-specific scheduling to leverage diversity and spatial reuse gains from the network.

6. The method of claim 1, comprising generating a diversity schedule that optimizes multicast (MC) flows.

7. The method of claim 1, comprising generating the spatial reuse schedule that optimizes unicast (UC) flows.

8. The method of claim 1, comprising determining at a BS an effective schedule that provides the maximum marginal utility for UC and MC users, taking throughput and fairness into account.

9. The method of claim 1, wherein the integrated schedule is given by:

$$\arg\max_{S_U, S_M} \alpha \Sigma_{j \in S_v} \Delta U_j + (1-\alpha) \Sigma_{G \in S_M} \Delta U_G$$

$S_U$—spatial reuse schedule for UC flows, $S_U$—diversity schedule for MC flows, $\Delta U_j > 0$—marginal utility of UC user j, $\Delta U_G > 0$—marginal utility of MC group G, $\alpha$—prioritization factor between 0 and 1.

10. The method of claim 1, comprising applying a utility measure per user for unicast or a group for multicast that accounts for instantaneous rate and fairness in a schedule.

11. The method of claim 10, comprising determining $$\Delta U_j = \frac{\beta_j r_j^{\mathit{eff}}}{\bar{r}_j}$$

as the marginal utility of UC user j, where $\beta_j$ is a user j's QoS priority weight between 0 and 1, $\bar{r}_j > 0$ is the user j's average throughput, $r_j^{\mathit{eff}} > 0$ is an effective two-hop rate accounting for relay and access channels allocated to user j.

12. The method of claim 10, comprising determining $$\Delta U_G = \frac{\beta_G |G| r_G^{\mathit{eff}}}{\bar{r}_G}$$

as the marginal utility of MC group G, where $\beta_G$ is a group G's QoS priority weight between 0 and 1, $\bar{r}_G$ is the group G's average throughput, t, $r_G^{\mathit{eff}} > 0$ is an effective two-hop rate accounting for relay and access channels allocated to group G.

13. The method of claim 1, comprising
   a. determining at the BS a net marginal utility per slot resulting from a diversity and spatial reuse schedules and
   b. selecting a schedule providing the highest marginal utility.

14. The method of claim 1, comprising determining a marginal utility per slot of UC and MC flows resulting from a diversity schedule as $$\left( \frac{\alpha \Delta U_{DIV}^{UC} + (1-\alpha) \Delta U_{DIV}^{MC}}{2} \right)$$

with $\Delta U_{DIV}^{UC}>0$ being a marginal utility of the diversity schedule for unicast (UC) flows, $\Delta U_{DIV}^{MC}>0$ being a marginal utility of the diversity schedule for multicast (MC) flows, and α being between 0 and 1.

15. The method of claim 1, comprising determining a marginal utility per slot of UC and MC flows resulting from a spatial reuse schedule as $$\left(\frac{\alpha \Delta U_{SR}^{UC} + (1-\alpha)\Delta U_{SR}^{MC}}{3}\right)$$

with $\Delta U_{SR}^{UC}>0$ being a marginal utility of the spatial reuse for unicast (UC) flows, $\Delta U_{SR}^{MC}>0$ being a marginal utility of the spatial reuse schedule for multicast (MC) flows, and α being between 0 and 1.

16. The method of claim 1, comprising generating schedules in multiples of two or three slots.

17. The method of claim 1, comprising dynamically switching between the two (diversity and spatial reuse) schedules to provide efficient allocation of resources between the unicast and multicast flows while accounting for fairness.

18. The method of claim 6, comprising applying a underlying diversity (DIV) on the set of UC and MC flows independently to obtain two-hop flow schedules for UC and MC that leverage user, channel, hop and cooperative diversity gains.

19. The method of claim 6, comprising scheduling the UC and MC relay links flows in slot t, and scheduling the UC and MC access links in slot t+1.

20. The method of claim 7, comprising performing diversity DIV to leverage multi-user and channel diversity gains within and across hops and cooperation diversity within hops.

21. The method of claim 7, comprising performing cooperative diversity COOP-DIV to leverage cooperative diversity gains across hops for MC flows in addition to the gains leveraged in diversity DIV.

22. The method of claim 7, comprising performing SR to leverage spatial reuse across the two hops for UC flows.

23. The method of claim 7, comprising partitioning the set of RS into a relay and an access set and if UC data exists on an access hop and running a diversity DIV scheduler on the access hop of the access set for UC flows.

24. The method of claim 7, comprising updating interference information from an (UC+MC) access links on a relay set.

25. The method of claim 7, comprising running the SR scheduler on relay set for UC flows.

26. The method of claim 7, comprising running the diversity DIV scheduler on a relay set for MC flows if a slot is the first slot of the spatial reuse schedule.

27. The method of claim 7, comprising running a cooperative diversity COOP-DIV scheduler on MC flows if a slot is the second slot of the spatial reuse schedule.

28. The method of claim 7, comprising obtaining a (UC+MC) access links waiting from previous slot, combining these access links with relay links of UC and MC flows obtained in a current slot, and scheduling all these links together in the current slot.

29. The method of claim 7, comprising retaining access links for UC and MC flows obtained in a current slot for schedule in a next slot.

* * * * *